(12) United States Patent
Seguchi et al.

(10) Patent No.: US 7,281,822 B2
(45) Date of Patent: Oct. 16, 2007

(54) OUTSIDE MIRROR APPARATUS FOR VEHICLE AND ILLUMINATING UNIT FOR OUTSIDE MIRROR APPARATUS

(75) Inventors: Hideki Seguchi, Isehara (JP); Hajime Yagi, Isehara (JP)

(73) Assignee: Ichokoh Industries, Ltd., Tokyo (JP)

( * ) Notice: Subject to any disclaimer, the term of this patent is extended or adjusted under 35 U.S.C. 154(b) by 43 days.

(21) Appl. No.: 11/041,876

(22) Filed: Jan. 25, 2005

(65) Prior Publication Data

US 2005/0180032 A1 Aug. 18, 2005

(30) Foreign Application Priority Data

Feb. 2, 2004 (JP) ............... 2004-025999

(51) Int. Cl.
*F21S 4/00* (2006.01)
(52) U.S. Cl. .............. 362/249; 362/541; 362/542; 362/521; 362/244
(58) Field of Classification Search ........ 362/249, 362/494, 540, 541, 542, 544, 545, 548, 521, 362/244, 519, 549; 248/221.11, 222.11, 248/223.41
See application file for complete search history.

(56) References Cited

U.S. PATENT DOCUMENTS

| | | | |
|---|---|---|---|
| 6,505,963 B1 * | 1/2003 | Chiang | ............... 362/545 |
| 2001/0010633 A1 | 8/2001 | Apfelbeck | |
| 2003/0147253 A1 | 8/2003 | Shy | |

FOREIGN PATENT DOCUMENTS

| GB | 2 382 132 A | 5/2003 |
|---|---|---|
| JP | 2002-79878 A | 3/2002 |

* cited by examiner

*Primary Examiner*—Sharon Payne
(74) *Attorney, Agent, or Firm*—Foley & Lardner LLP

(57) ABSTRACT

An outside mirror apparatus for a vehicle includes an illuminating unit that includes a light source including a plurality of light emitting elements arranged on a flexible sheet member; a base including a mounting section for mounting the light source; and a lens that divides, with the base, a lamp chamber that contains the light source. The light source is mounted on the mounting section in a curved state or in a bent state.

22 Claims, 15 Drawing Sheets

US 7,281,822 B2

OUTSIDE MIRROR APPARATUS FOR VEHICLE AND ILLUMINATING UNIT FOR OUTSIDE MIRROR APPARATUS

CROSS-REFERENCE TO RELATED APPLICATIONS

The present document incorporates by reference the entire contents of Japanese priority document, 2004-025999 filed in Japan on Feb. 2, 2004.

BACKGROUND OF THE INVENTION

1) Field of the Invention

The present invention relates to an outside mirror apparatus for a vehicle, and an illuminating unit for the outside mirror apparatus.

2) Description of the Related Art

An outside mirror apparatus for a vehicle and an illuminating unit for the outside mirror apparatus have been disclosed in Japanese Patent Application Laid-open Publication No. 2002-79878. The illuminating unit described in the above literature is installed in a door mirror and includes a light source, a lens for widening the light, and a base on which the lens is installed.

To improve the visibility by the lighting unit, the outside mirror apparatus is structured such that the light from the light source is irradiated in a direction of width of a vehicle away from the vehicle and in a direction towards a rear side of the vehicle. Therefore, the outside mirror apparatus disclosed in Japanese Patent Application Laid-open Publication No. 2002-79878 uses a plurality of light sources divided, for radiation of the light in two directions. The light sources are fixed to a terminal plate (mounting bracket) that is structured separately, making different angles. The terminal plate is fixed to the base.

However, the mounting structure of the light sources is complicated and includes a large number of components which makes the manufacturing process of the product complex.

SUMMARY OF THE INVENTION

It is an object of the present invention to solve at least the above problems in the conventional technology.

An outside mirror apparatus for a vehicle according to one aspect of the present invention includes an illuminating unit that includes a light source including a plurality of light emitting elements arranged on a flexible sheet member; a base including a mounting section for mounting the light source; and a lens that divides, with the base, a lamp chamber that contains the light source. The light source is mounted on the mounting section in a curved state or in a bent state.

An illuminating unit according to another aspect of the present invention, which is installed in an outside mirror apparatus for vehicle, includes a lens and a base that divide a lamp chamber; a mounting section that is provided on the base inside the lamp chamber, and has a mounting surface that includes at least one flat surface or at least one curved surface, or both; and a light source that is mounted along the mounting surface. The light source includes a plurality of light emitting elements arranged on a flexible sheet member along the mounting surface.

The other objects, features, and advantages of the present invention are specifically set forth in or will become apparent from the following detailed description of the invention when read in conjunction with the accompanying drawings.

DETAILED DESCRIPTION

Figure 1:
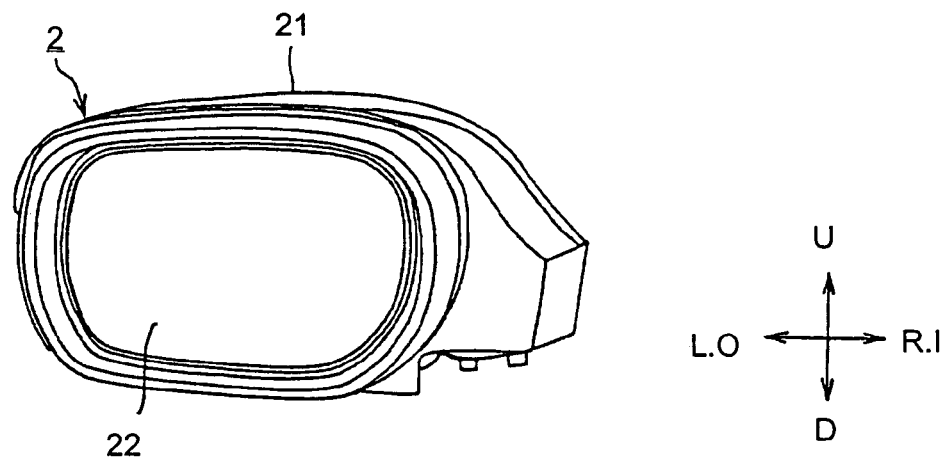
FIG. 1 is a perspective view of an outside mirror apparatus and an illuminating unit for the outside mirror apparatus according to an embodiment of the present invention.

Embodiments of an outside mirror apparatus and a lighting source for the outside mirror apparatus according to the present invention are described below in detail with reference to the accompanying drawings. However, the present invention is not restricted to these embodiments only. Moreover, all modifications, alternative constructions, and substantially identical structures that may occur to one skilled in the art are included in components of the embodiment.

FIGS. 1 to 7 depict the embodiment of the present invention where a reference numeral F denotes a front side of a vehicle, a reference numeral B denotes a rear side of the vehicle, a reference numeral R denotes a right side of the vehicle, a reference numeral L denotes a left side of the vehicle, a reference numeral U denotes a side above the vehicle, a reference numeral D denotes a side under the vehicle, a reference numeral O denotes an outer side (a side along the width of the vehicle), and a reference numeral I denotes an inside (central side) of the vehicle.

Figure 2:
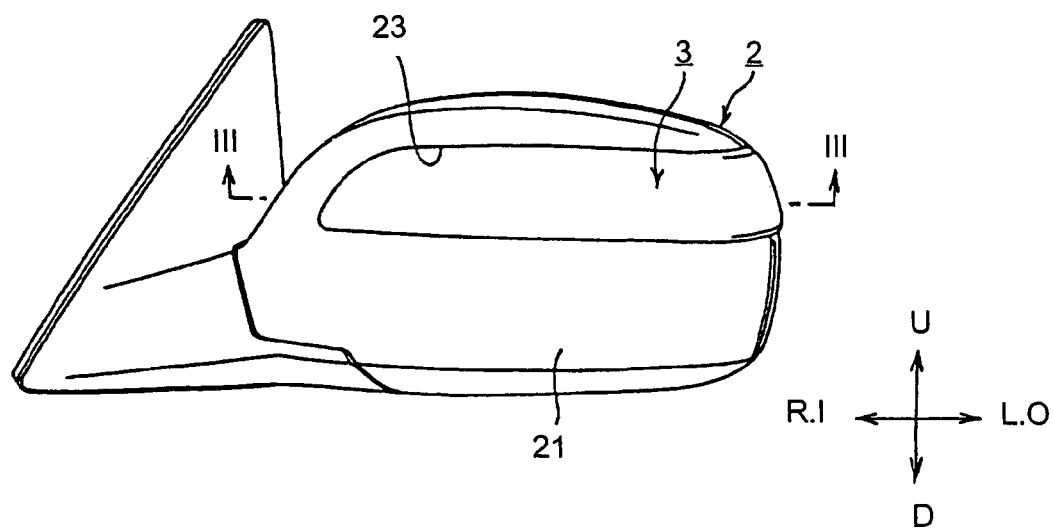
FIG. 2 is a perspective view of the outside mirror apparatus and the illuminating unit for the outside mirror apparatus according to the embodiment of the present invention.

A door mirror 2 is an outside mirror apparatus according to the embodiment. The door mirror 2 is provided with an illuminating unit 3. The door mirror 2 includes a mirror housing 21 and a mirror 22. The mirror housing 21 has an opening and has a shape of a curved receptacle. The mirror 22 is installed by fitting in the opening of the mirror housing 21. The door mirror 2 is installed on a body (such as a door) of the vehicle by fixing the mirror housing 21 such that a reflecting surface of the mirror is directed towards a rear side (side of a driving seat) of the vehicle. A notch 23 is cut in the mirror housing 21 such that it runs along the width of the vehicle away from the vehicle from a front side of the vehicle, when the door mirror 2 is installed on the vehicle as shown in FIG. 2. In FIGS. 1 and 2, the door mirror 2 installed on a left side of the vehicle is shown. A door mirror installed on a right side of the vehicle has a right side and a left side reversed in the door mirror 2 installed on the left side.

Figure 3:
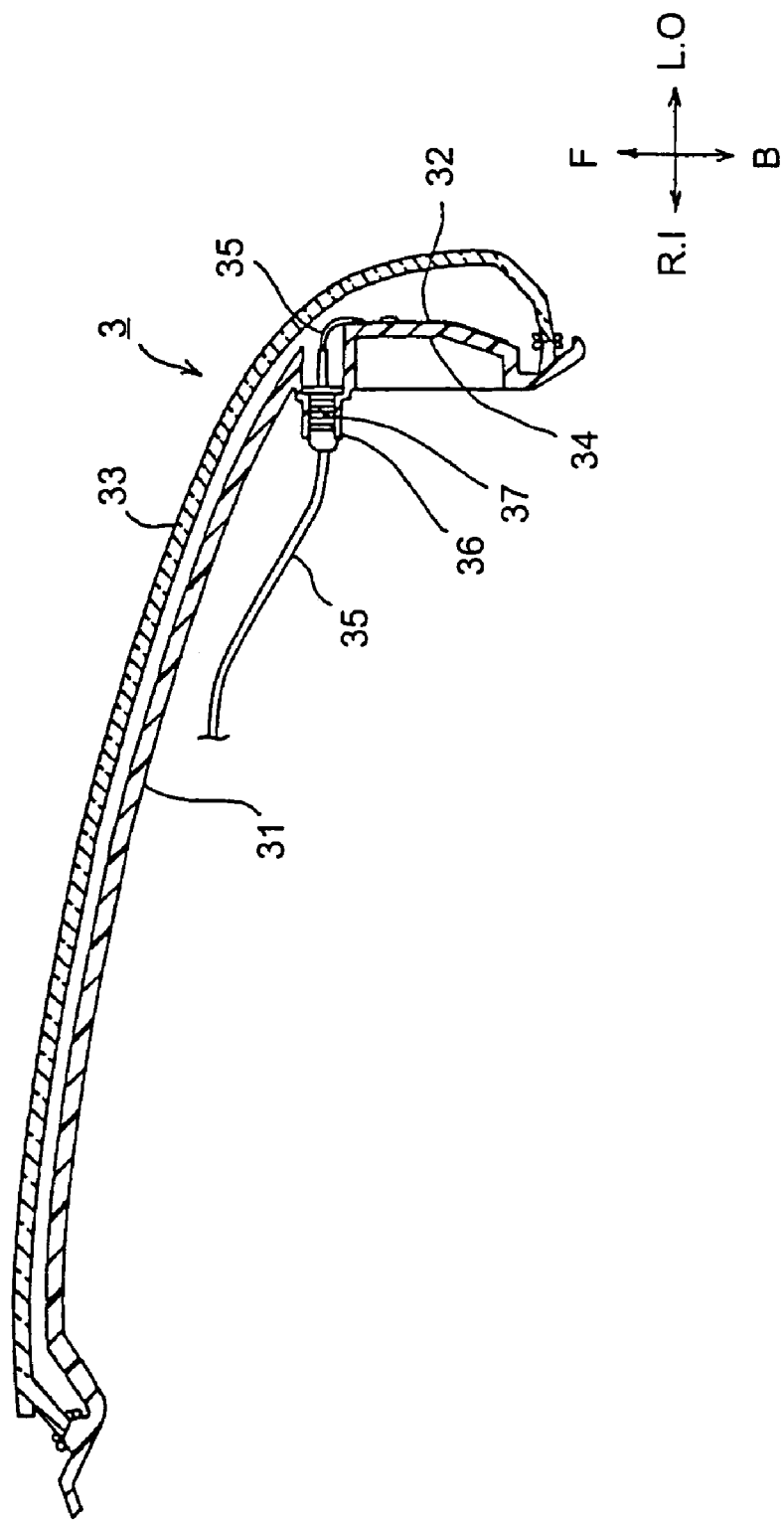
FIG. 3 is a III-III cross section of the outside mirror apparatus and the illuminating unit shown in FIG. 2.

The illuminating unit 3, as shown in FIG. 3, includes a base (lamp housing) 31, a light source (light-source member) 32, and a lens (lamp lens) 33. The base 31 is made of a resin-based material. The base 31 has a thin slender shape that allows it to be fitted in the notch 23 of the door mirror 2. Moreover, the base 31 has a gentle curve shape along an outer peripheral surface of the door mirror 2. The illuminating unit 3, in this example, is a side-turning lamp for the door mirror 2. However, according to the present invention, the illuminating unit 3 may also be used as a lamp other than the side-turning lamp, such as a foot lamp, an illuminating lamp for a camera (including a visible light lamp and an infrared lamp), and a lamp for decoration.

The light source 32 is mounted on a mounting section 34 that is provided at an end in a longitudinal direction of the base 31. The mounting section 34 is formed as an integral part of the base 31 and is formed simultaneously while forming the base 31 (for example, while injection molding). The lens 33 is at a predetermined distance from the base 31 and the light source 32, and is installed such that a surface of the base 31 and the light source 32 are covered by the lens 33 (see FIG. 3). The lens 33 has a function of widening and irradiating the light emitted by the light source 32 to outside, when the illuminating unit 3 performs its function. The illuminating unit 3 is installed by fitting in the notch 23 of the door mirror 2 such that a surface of the lens 33 is roughly in the same plane as that of the outer peripheral surface (a surface on a front side of the vehicle) of the mirror housing 21.

In the illuminating unit 3, the structure is such that the light source 32 is disposed at a rear end (in a direction along the width of the vehicle away from the vehicle) of the door mirror 2. Moreover, in the illuminating unit 3, a wiring cord 35 is connected to the light source 32. The wiring cord 35 is pulled out from a through opening 36 in the form of a cylinder that is provided in the base 31. The wiring cord 35 runs inside the door mirror 2, and is connected to an operation switch and a power supply (not shown in the diagram) on the vehicle side. An elastic grommet or any other seal member 37 is provided on the wiring cord 35. The seal member 37 is fitted in the through opening 36 of the base 31 and seals an interval between the through opening 36 and the wiring cord 35. By sealing, a space between the base 31 and the lens 33 is sealed up with respect to the outside and an entry of water from the outside is controlled.

Figure 4:
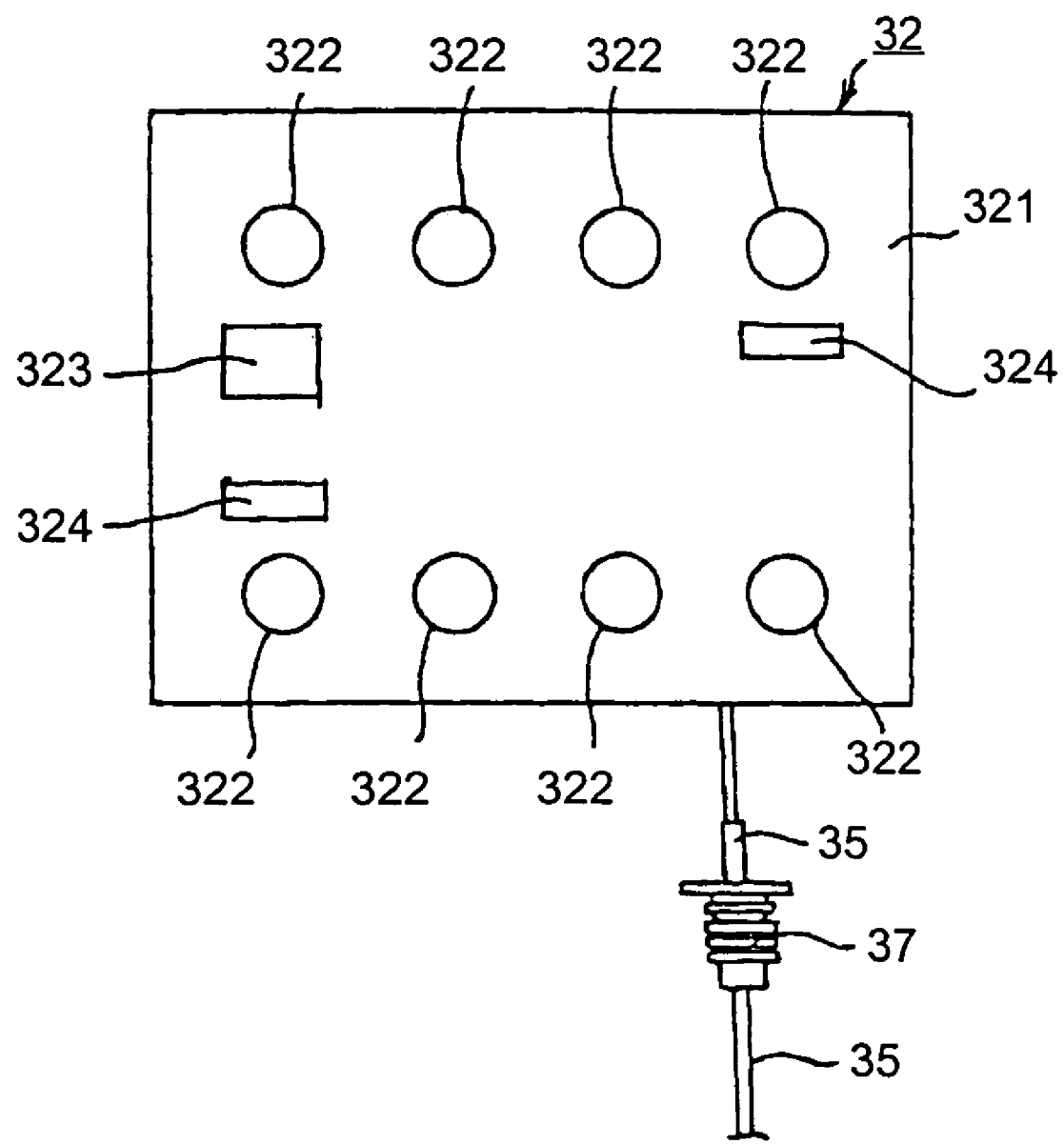
FIG. 4 is plane view of light sources of the illuminating unit shown in FIG. 3.

The light source 32, as shown in FIG. 4, includes a flexible sheet 321, a plurality of light emitting elements 322, a diode 323, and at least one resistor 324. The flexible sheet 321 is a flexible member in the form of a sheet. The diode 323 is an electronic component that causes the light-emitting element 322 to emit light. The light source 32 is in the form of a sheet, but may also be curved or bent. The flexible sheet 321 is made of a resin film that can be curved or bent or a thin metal plate or any other flexible material, and is substantially rectangular in shape. The light emitting elements 322 are arranged in a row on the flexible sheet 321 (in this light source 32, two rows of four light emitting elements 322 each, i.e. total eight light emitting elements 322 are arranged) and they emit light by a combined effect with the diode 323 and the resistor 324. Thus, a function of the light source 32 is realized. In this light source 32, a coat of white color or silver color, which is a good reflector of light, is applied on a surface (a surface in a direction of irradiation of light by the light source 32) of the flexible sheet 321. Due to this, the light from the light source is reflected efficiently and efficiency of the light is improved.

The light source 32 includes a plurality of LED's as the light emitting elements 322 and the diode 323 and the resistor 324 as the electronic components surface mounted on a front surface of the flexible sheet 321 of a material such as glass epoxy resin. For surface mounting, a chip of a material such as an epoxy resin that includes the light emitting elements 322 is fixed by bonding on a front surface of the of the flexible sheet 321. The chip is covered by a lens made of a transparent resin and the lens is fixed to the surface of the flexible sheet 321. A wiring that connects electrically the light emitting elements 322, the diode 323, and the resistor 324 is printed on the front surface or a rear surface of the flexible sheet 321. Furthermore, the wiring cord 35 is connected electrically to a terminal section of the wiring of the flexible sheet 321.

Figure 5A:
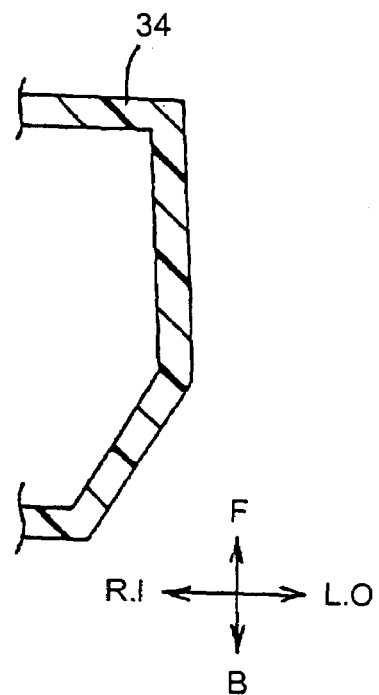
FIG. 5A is an enlarged cross section of a mounting section of the light source in the illuminating unit.
Figure 5B:
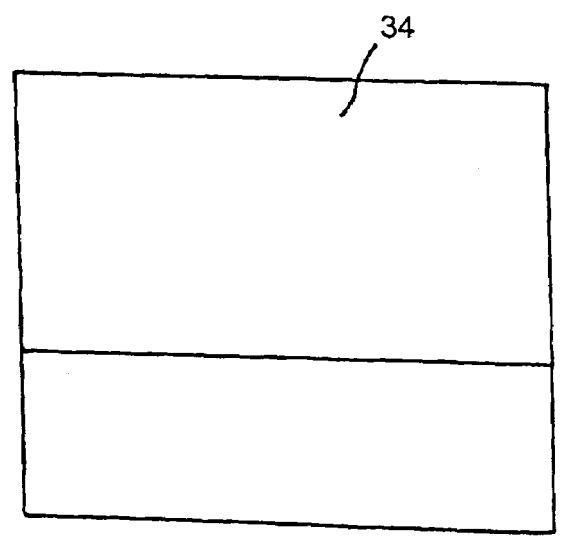
FIG. 5B is a front view of the mounting section of the light source in the illuminating unit.

The mounting section 34, as shown in FIGS. 5A and 5B, has a surface formed by two substantially rectangular flat surfaces that are bent, and the light source 32 is mounted on this surface (mounting surface). The mounting section 34 is formed such that one of the two flat surfaces is directed towards a direction of width of the vehicle away from the vehicle and the other flat surface is tilted with respect to the first flat surface and is directed somewhat towards the rear side of the vehicle (see FIGS. 5A and 5B), when the door mirror 2 is installed on the door of the vehicle. Due to this, the light source 32 mounted on the mounting section 34 is disposed such that the light is irradiated in a predetermined direction.

Figure 6A:
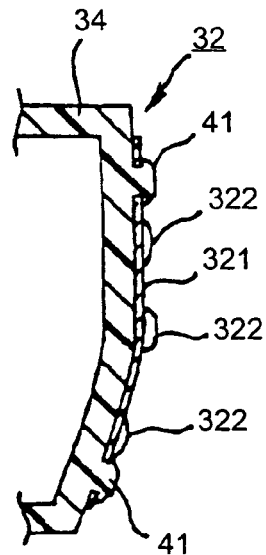
FIG. 6A is an enlarged cross section of a mounting structure of the light source.
Figure 6B:
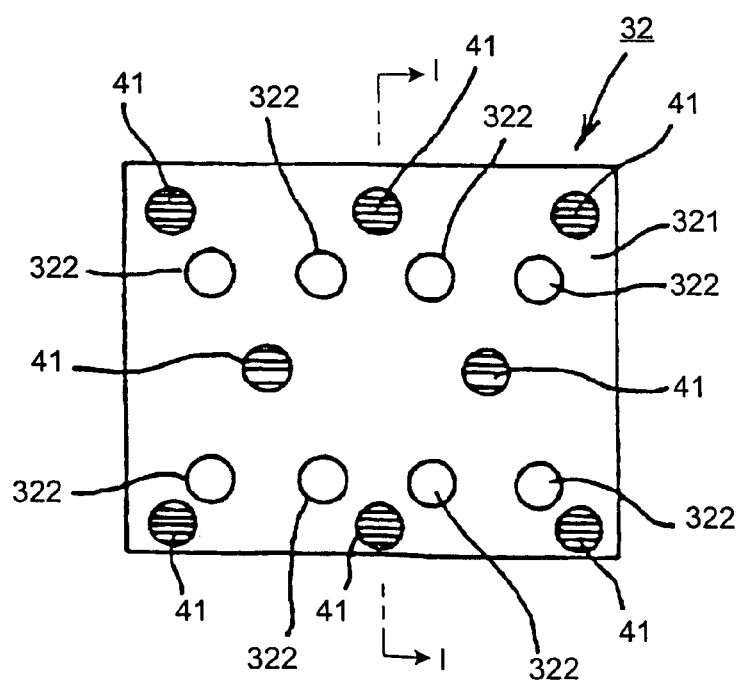
FIG. 6B is a front view of the mounting structure of the light source.
Figure 7:
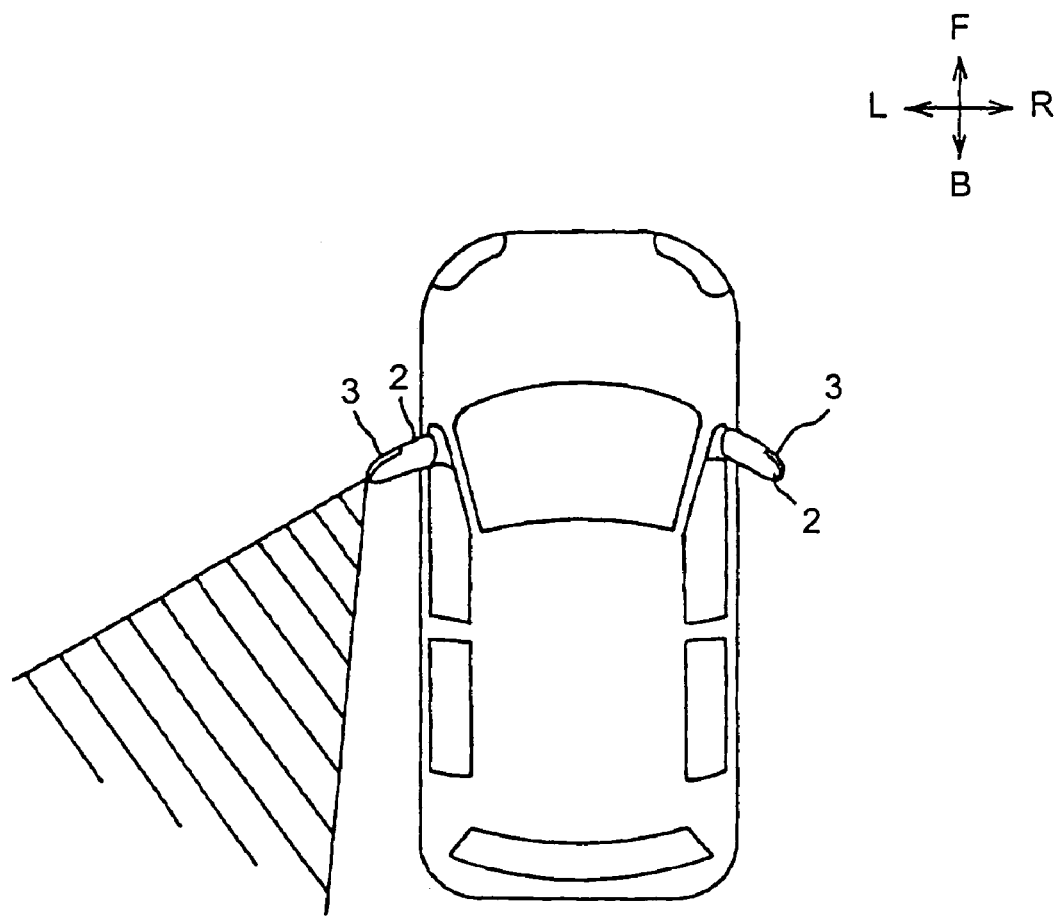
FIG. 7 is an illustration of a direction of irradiation from the light source.

A mounting structure of the light source 32 as shown in FIGS. 6A and 6B, includes a plurality of pins 41 as mounting members provided integrally on the surface (mounting surface) of the mounting section 34 and a plurality of holes at positions corresponding to the pins 41 are cut in the flexible sheet 321 of the light source 32. The pins 41 are inserted through the respective holes and flattened from the other side by thermal caulking, thereby fixing the light source 32 on the mounting section 34.

The light source 32 is disposed on the mounting section that is curved or bent, and is fixed to the mounting section 34 along a shape of the surface of the mounting section 34. When the door mirror 2 installed on the door of the vehicle, the light source 32 is disposed such that a part of the light emitting elements 322 is directed towards a direction of width of the vehicle away from the vehicle and the other part of the light emitting elements is directed towards somewhat rear side of the vehicle. Due to this, during the functioning of the illuminating unit 3, the light from the light source is irradiated in the direction of the width of the vehicle and towards the rear side of the vehicle (see FIG. 7).

According to this embodiment, the light source 32 of the illuminating unit 3 is formed by the plurality of light emitting elements 322 arranged on the flexible sheet 321. The light source 32 is mounted in a curved form or a bent form and is disposed such that the irradiated light is directed in a plurality of directions that are mutually different. Due to this, since the light from the light source 32 is irradiated in the plurality of directions, a wide-ranging light distribution pattern can be achieved. Moreover, according to this structure, since the light from the light source 32 is visible not only from the sides of the vehicle but also from the rear side of the vehicle, the visibility of a blinking signal from the illuminating unit 3 is improved. Furthermore, according to this embodiment, since the light source 32 is made of a member in the form of a flexible sheet, the light source 32 can be installed such that it can be curved or bent at any angle. Therefore, by adjusting the installation of the light source 32, the direction of irradiation of light can be adjusted voluntarily and easily such that the light is irradiated in a predetermined direction. Moreover, according to this structure, since the irradiation of light in the plurality of directions by using a single light source 32 can be realized, the number of components can be reduced as compared to those used in a light system disclosed in the Japanese Patent Application Laid-open Publication No. 2002-79878.

Moreover, since the light source 32 is a single light source made of a member in the form of a thin sheet, an installation space can be reduced as compared to that used in the light system disclosed in Japanese Patent Application Laid-open Publication No. 2002-79878. Thus, it is possible to reduce a size of a product (particularly, the size of the illuminating unit 3). Particularly, in a case of the door mirror 2 of the outside mirror apparatus, normally, a strict requirement in designing is that the lighting unit 3 has to be accommodated in a limited space of the mirror housing 21. In view of this requirement, the possible reduction in the size of the lighting unit 3 is very useful. Moreover, by using such a structure of the light source 32, the mounting section 34 of the light source 32 can be simplified as compared to that of the lighting unit disclosed in Japanese Patent Application Laid-open Publication No. 2002-79878.

Furthermore, as the mounting member that mounts the light source 32 on the mounting surface of the mounting section 34 includes the pins 41 that are integrated with the base 31, the number of components can be further reduced.

Since the light source 32 includes the light emitting elements 322, the diode 323, and the resistor 324 mounted on the flexible sheet, the light source 32 can be made thin, which in turn, allows the illuminating unit 3 to be compact. Therefore, the light source 32 is suitable as an illuminating unit that is used in the outside mirror apparatus such as the door mirror 2 with limited space for accommodation. Further, in the outside mirror apparatus such as the door mirror 2 equipped with the compact illuminating unit 3, since the space for accommodating the illuminating unit 3 can be limited to a great extent, there is a room for arranging and accommodating other systems, thereby improving a degree of freedom of arrangement, accommodating, and designing of a shape of the unit. Since light source 32 includes the light emitting elements 322, the diode 323, and the resistor 324 mounted on the flexible sheet, the illuminating unit 3 does not require a separate circuit and the circuit can be simplified, thereby, further reducing the number of components. Therefore, the illuminating unit 3 is suitable as an illuminating unit that is used in the outside mirror apparatus such as the door mirror 2 and also suitable for the outside mirror such as the door mirror 2 that is equipped with the illuminating unit 3.

The light source 32 is installed such that the light is irradiated along the direction of width of the vehicle away from the vehicle and the direction towards the rear side of the vehicle. However, instead of restricting the installation to this, the light source 32 may be installed such that the light is irradiated in more than these two directions. Concretely, the angles of irradiation and the directions of irradiation can be diversified by changing the angle of curving or the angle of bending. The direction of irradiation of light from the light source 32 may also be only one direction.

The shape of the surface of the mounting section 34 (shape of the mounting surface) is that of two flat surfaces, i.e. two flat surfaces that are bent (see FIGS. 5A and 5B). Since the mounting section 34 in this case has a single and integral structure, as compared to that disclosed in Japanese Patent Application Laid-open Publication No. 2002-79878, it is desirable since the manufacturing process is simple. The mounting section 34 can be integrated with the base 32 by changing partially the shape of an end portion of the base 31. It is also possible to form the mounting section 34 simultaneously while forming the base 31. This allows reducing the number of components and the number of steps involved in the manufacturing process. An angle of refraction of the two flat surfaces that form the mounting surface can be adjusted easily to any angle. Therefore, the direction of irradiation of light from the light source 32 can be adjusted easily to any direction by adjusting the shape of the surface during the formation. This enables the light source 32 to be installed easily such that the light is irradiated in the predetermined direction, thereby facilitating the installation. Since the shape of the surface of the mounting section 34 is flat, the light source 32 in the form of the sheet fits perfectly on the mounting section 34, and it can be mounted stably. Irrespective of this, the mounting section 34 of the base 31 may also have a shape of a curved surface or may also be formed by two separated flat surfaces or two curved surfaces. Concretely, the shape of the front surface of the mounting section 34 may be formed such that the light from the light source 32 is irradiated in the predetermined direction.

The light source 32 is installed by fixing to the mounting surface by thermal caulking (see FIGS. 6A and 6B). However, the mounting structure of the light source 32 is not restricted to such a structure and may be selected appropriately or designed in a different manner within the scope that is evident for the one skilled in the art. An example of a mounting structure of the light source 32 is described below with reference to the diagrams.

Figure 8A:
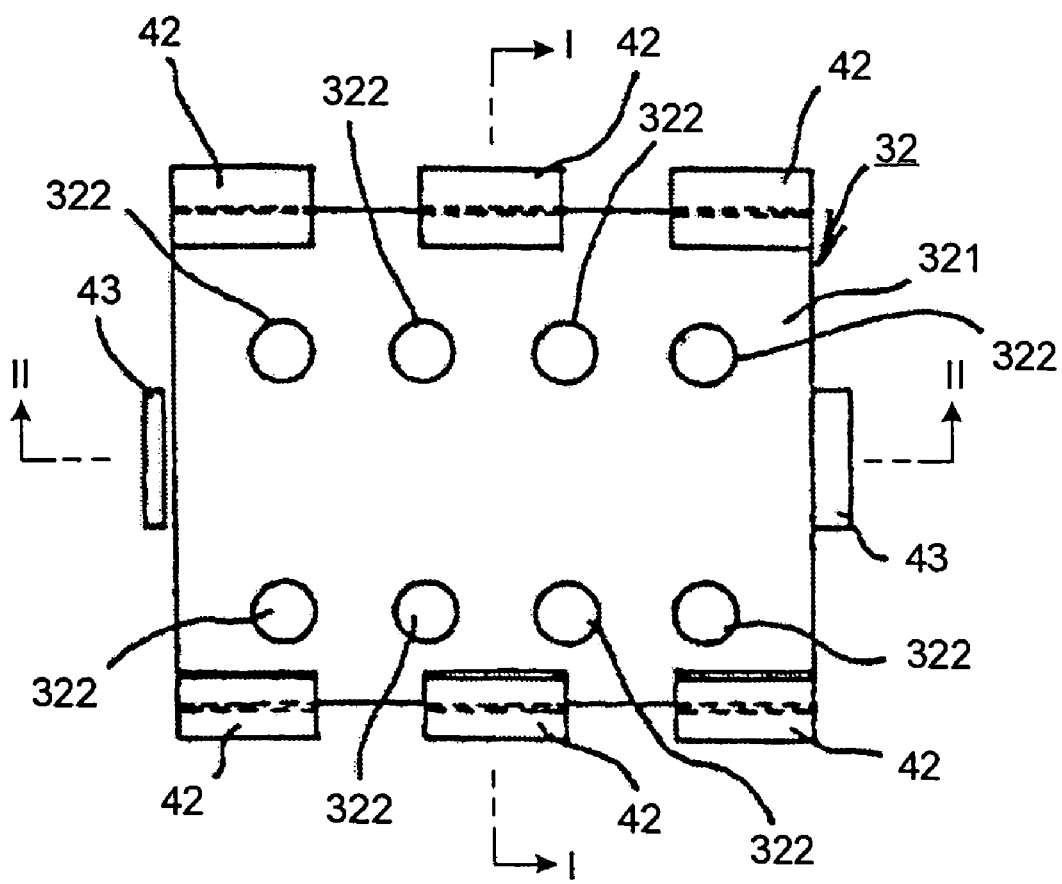
FIG. 8A is a front view of a first modified example of the mounting structure of the light source.
Figure 8B:
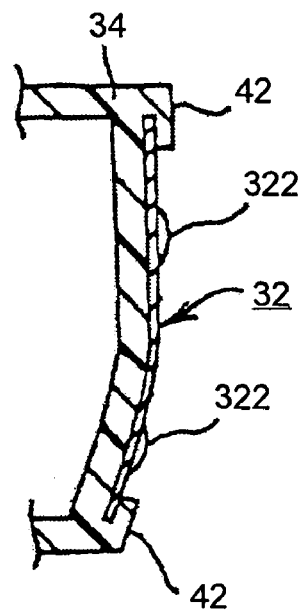
FIG. 8B is a I-I cross section of the mounting structure of the light source shown in FIG. 8A.
Figure 8C:
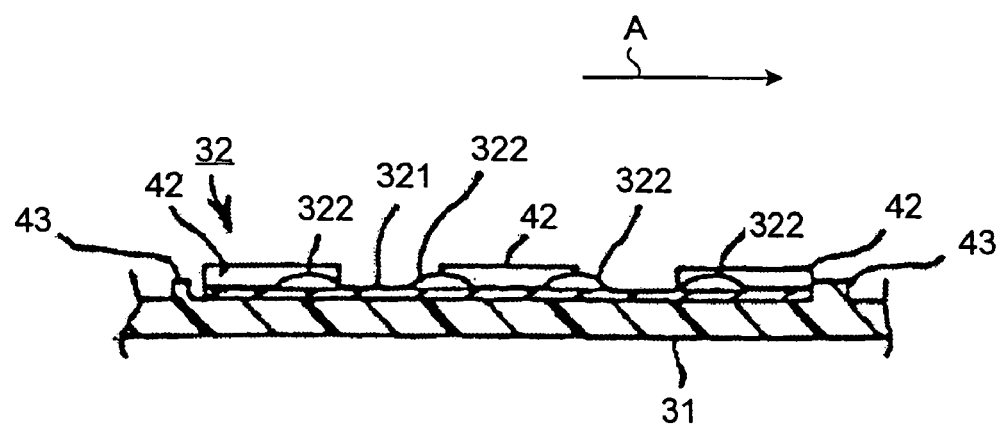
FIG. 8C is a II-II cross section of the mounting structure of the light source shown in FIG. 8A.

FIGS. 8A, 8B, and 8C are diagrams of a first modified example of the mounting structure of the light source 32. According to this structure, the mounting section 34 includes a plurality of guide rails 42 that are provided integrally along one set of the opposite sides (opposite sides positioned at the front side and the rear side of the vehicle)

and a pair of ribs 43 that are provided integrally on the other set of opposite sides. The light source 32 is slid in a direction of an arrow A and fitted on the guide rail 42 and both ends are held by the ribs 43. Thus, the light source 32 is prevented from coming off from the guide rail 42 by the ribs 43 and is fixed firmly on the mounting section 34. As shown in FIGS. 8A, 8B, and 8C, the width of the rib 43 on the left side is smaller than that of the rib 43 on the right side and is formed such that the light source can be inserted easily.

Figure 9A:
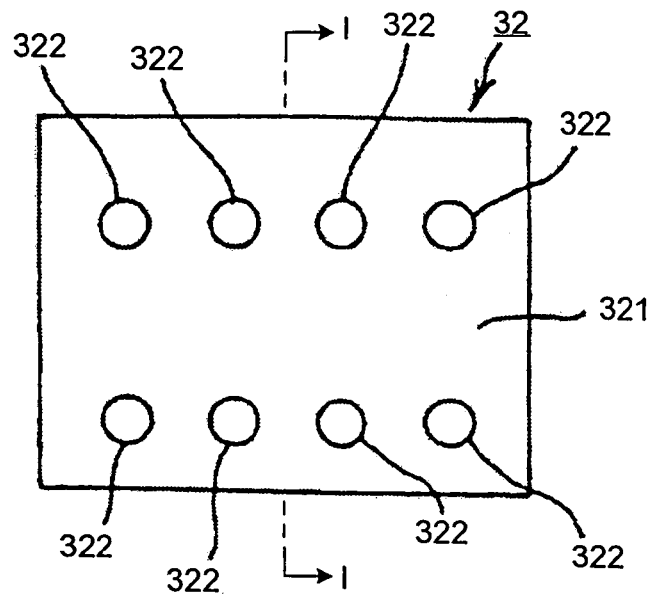
FIG. 9A is a front view of a second modified example of the mounting structure of the light source.
Figure 9B:
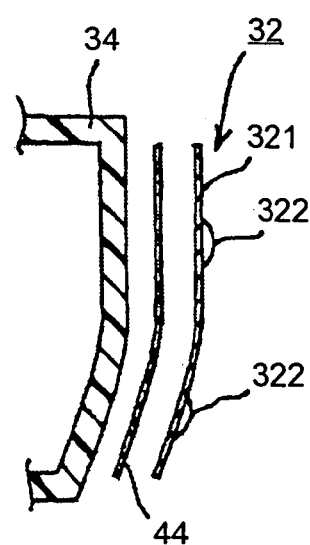
FIG. 9B is a I-I cross section of the mounting structure shown in FIG. 9A.

FIGS. 9A and 9B are diagrams of a second modified example of the mounting structure of the light source 32. According to this structure, the light source 32 is fixed to the mounting section 34 by attaching by an adhesive member 44 such as a double sided adhesive tape or an adhesive.

Figure 10A:
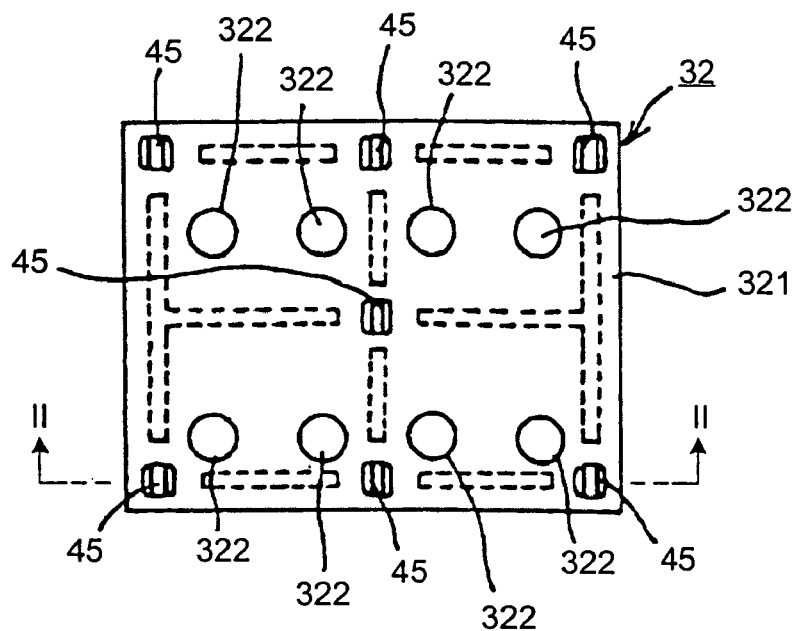
FIG. 10A is a front view of a third modified example of the mounting structure of the light source.
Figure 10B:
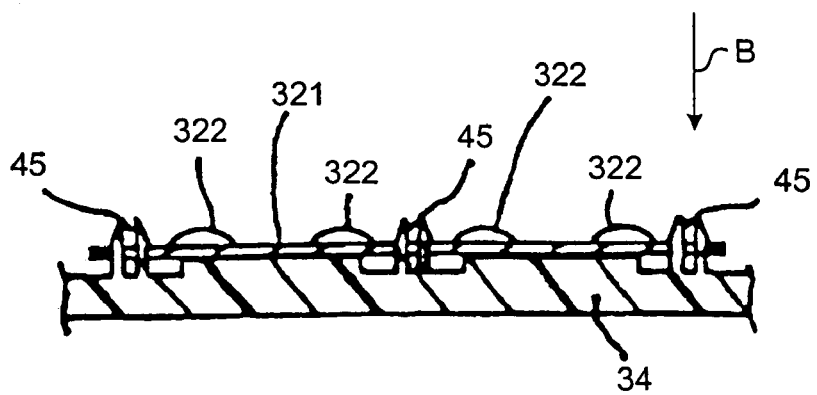
FIG. 10B is a II-II cross section of the mounting structure shown in FIG. 10A.

FIGS. 10A and 10B are diagrams of a third modified example of the mounting structure of the light source 32. According to this structure, a plurality of snap-fit shaped claws 45 are provided on a front surface of the mounting section 34 and a plurality of holes in positions corresponding to the claws 45 are cut in the flexible sheet 321 of the light source 32. The light source 32 is fixed on the mounting section 34 by inserting to claws 45 into these holes in a direction of an arrow B in FIG. 10B.

Figure 11A:
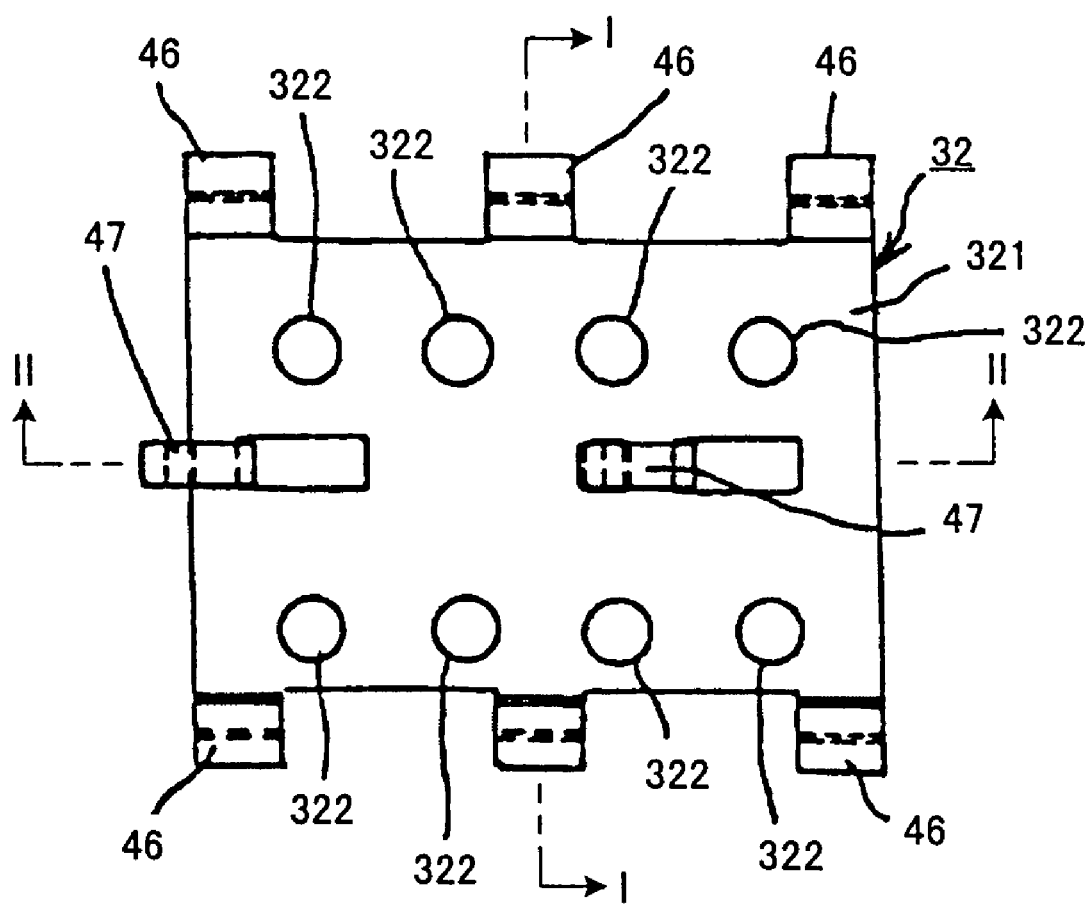
FIG. 11A is a front view of a fourth modified example of the mounting structure of the light source.
Figure 11B:
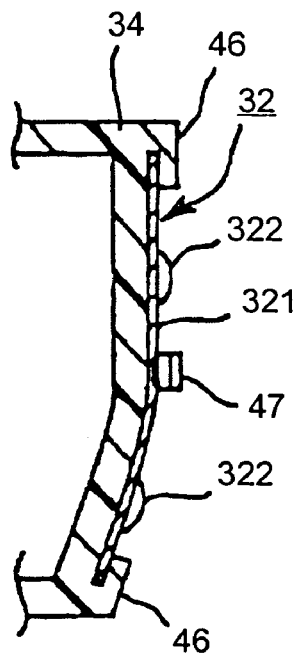
FIG. 11B is a I-I cross section of the mounting structure shown in FIG. 11A.
Figure 11C:
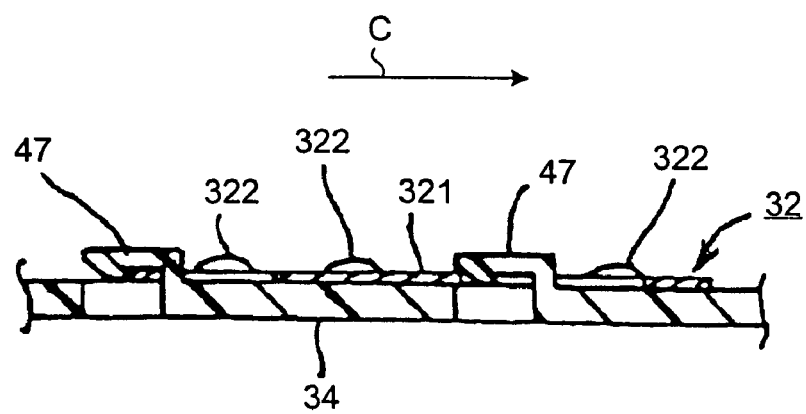
FIG. 11C is a II-II cross section of the mounting structure shown in FIG. 11A.

FIGS. 11A, 11B, and 11C are diagrams of a fourth modified example of the mounting structure of the light source 32. According to this structure, the mounting section 34 includes a plurality of guide rails 46 that are provided along one set of the opposite sides (opposite sides positioned at the front side and the rear side of the vehicle) and latches 47 that are provided at the center. The light source 32 has holes at positions corresponding to the latches 47. The light source 32 is slid in a direction of an arrow C in FIG. 11C and fitted on guide rails 46 and fixed by inserting the latches 47 into the holes, thereby fixing the light source 32 on the mounting section 34.

Figure 12A:
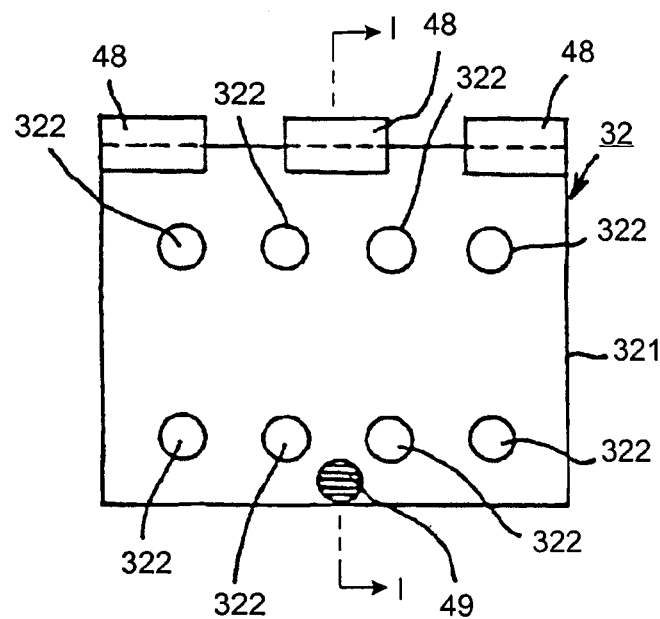
FIG. 12A is a front view of a fifth modified example of the mounting structure of the light source.
Figure 12B:
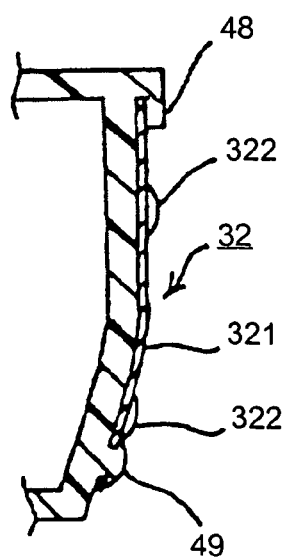
FIG. 12B is a I-I cross section of the mounting structure shown in FIG. 12A.

FIGS. 12A and 12B are diagrams of a fifth modified example of the mounting structure of the light source 32. According to this structure, the mounting section 34 includes a plurality of guide rails 48 that are provided along one of the sides (a side positioned at the front side of the vehicle) and a pin 49 that is provided near the side opposite to the side positioned at the front end of the vehicle. The light source 32 has a hole at a position corresponding to the pin 49. The light source 32 is fixed on the mounting section 34 by allowing an edge of one of the sides to slide over and fit on the guide rails 48, and by inserting the pin 49 into the hole and flattening the pin from the other side by thermal caulking.

Figure 13A:
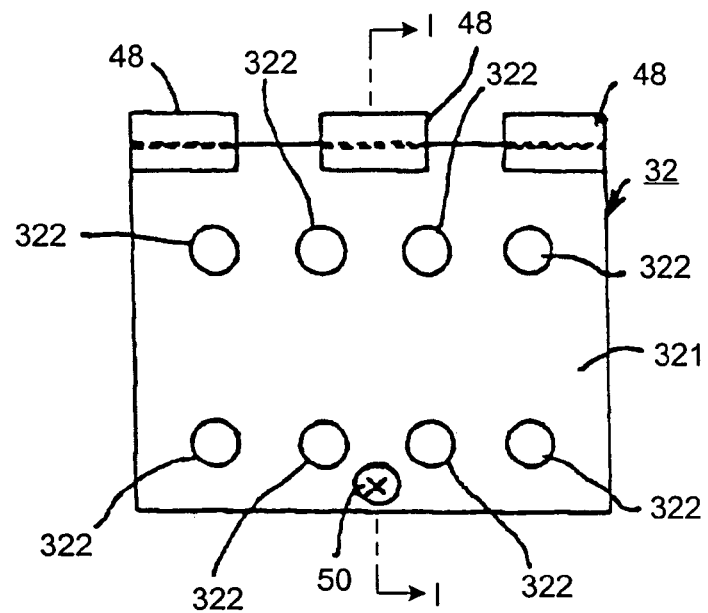
FIG. 13A is a front view of a sixth modified example of the mounting structure of the light source.
Figure 13B:
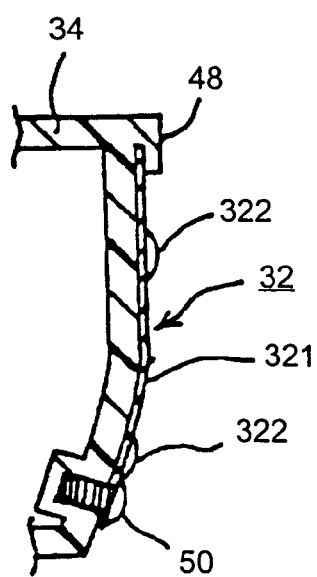
FIG. 13B is a I-I cross section of the mounting structure shown in FIG. 13A.

FIGS. 13A and 13B are diagrams of a sixth modified example of the mounting structure of the light source 32. According to this structure, in the mounting structure of the light source 32 according to the fifth modified example, the light source 32 is fixed by a screw 50 instead of the pin 49, which is a peculiarity of this structure. The light source 32 is fixed firmly on the mounting section 34 by this structure as well.

Figure 14A:
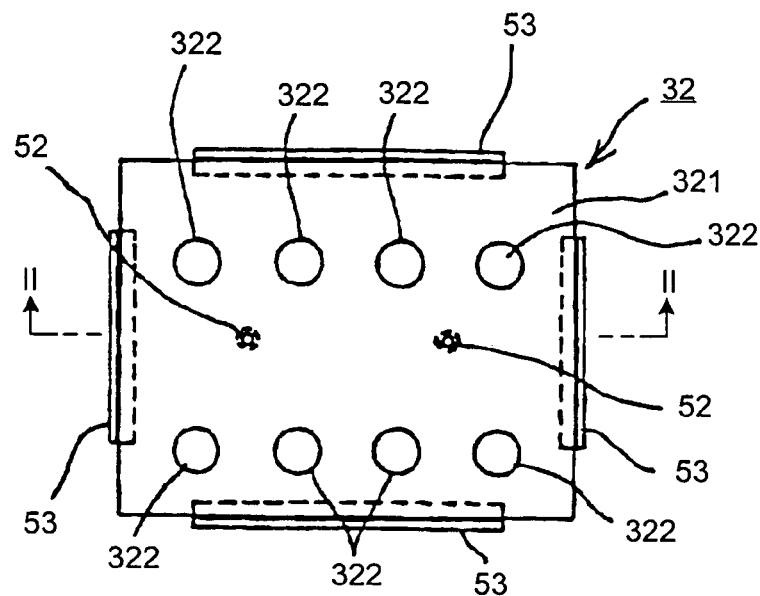
FIG. 14A is a front view of a seventh modified example of the mounting structure of the light source.
Figure 14B:
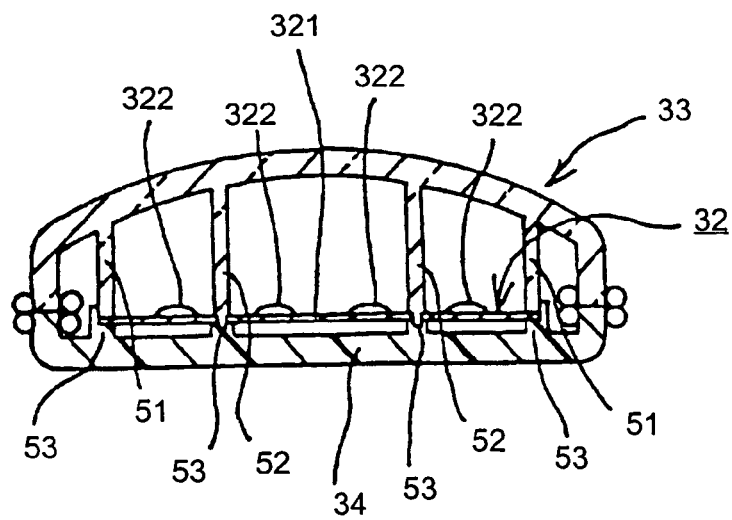
FIG. 14B is a II-II cross section of the mounting structure shown in FIG. 14A.

FIGS. 14A and 14B are diagrams of a seventh modified example of the mounting structure of the light source 32. According to this structure, a lens 33 has a plurality of ribs 51 and a plurality of pins 52 on an inner peripheral surface (surface facing the mounting section 34). The mounting section 34 has receiving ribs 53 at positions corresponding to the ribs 51 and the pins 52. The light source 32 is disposed on the receiving ribs 53 of the mounting section 34, held from above by the ribs 51 and the pins 52 of the lens 33, and is fixed by sandwiching between the receiving ribs 53 and the ribs 51, and the pins 52.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An outside mirror apparatus for a vehicle, the outside mirror apparatus comprising:
   a mirror with a mirror housing and an illuminating unit within the mirror housing, the illuminating unit comprising:
   a light source including a plurality of light emitting elements arranged on a flexible sheet member;
   a base including a mounting section for mounting the light source; and
   a lens that forms, with the base, a lamp chamber that contains the light source,
   wherein the light source is mounted on the mounting section in a curved state or in a bent state,
   wherein the mounting section includes a mounting member for mounting the light source along the mounting surface, and
   wherein the mounting member is at least one of:
   a pin that is inserted into a hole cut in the flexible sheet member, a first side of the pin being integrally provided with the mounting surface and a second side of the pin is flattened by to thermal caulking;
   a first plurality of guide rails in which one set of sides of the flexible sheet member is fitted, and a pair of ribs that latch another set of sides of the flexible sheet member;
   a snap-fit claw that is inserted into a hole cut in the flexible sheet member, and is hooked into the hole;
   a second plurality of guide rails in which at least one side of the flexible sheet member is fitted, and a latch that is inserted into a hole cut in the flexible sheet member, and is locked;
   a third plurality of guide rails in which one side of the flexible sheet member is fitted, and a pin that is inserted into a hole cut on other side of the flexible sheet member, and is subjected to a thermal caulking;
   a fourth plurality of guide rails in which one side of the flexible sheet member is fitted, and a screw that fixes other side of the flexible sheet member; and
   a plurality of pins and a plurality of ribs that are provided integrally on an inner peripheral surface of the lens, and a receiving rib that fixes the flexible sheet member by sandwiching the flexible sheet member with the pins and the ribs.

2. The outside mirror apparatus according to claim 1, wherein the mounting section has a surface profile formed with a curved surface or a bent flat surface, and
wherein the light source is arranged along the surface profile.

3. The outside mirror apparatus according to claim 1, wherein the mounting member is integrally provided in the mounting section.

4. The outside mirror apparatus according to claim 1, wherein the mounting member is the pin that is inserted into the hole cut in the flexible sheet member, the first side of the pin being integrally provided with the mounting surface and the second side of the pin that is flattened by a thermal caulking.

5. The outside mirror apparatus according to claim 1, wherein the mounting member is the first plurality of guide rails in which one set of sides of the flexible sheet member is fitted, and a pair of ribs that latches another set of sides of the flexible sheet member.

6. The outside mirror apparatus according to claim 1, wherein the mounting member is the second plurality of guide rails in which at least one side of the flexible sheet member is fitted, and the latch that is inserted into the hole cut in the flexible sheet member, and is locked.

7. The outside mirror apparatus according to claim 1, wherein the mounting member is the third plurality of guide rails in which one side of the flexible sheet member is fitted, and the pin that is inserted into a hole cut on other side of the flexible sheet member, and is subjected to a thermal caulking.

8. An illuminating unit that is configured to be installed in an outside mirror apparatus for vehicle, the illuminating unit comprising:
a lens and a base that form a lamp chamber;
a mounting section that is provided on the base inside the lamp chamber, and that has a mounting surface that includes at least one flat surface or at least one curved surface, or both; and a light source that is mounted along the mounting surface,
wherein the light source includes a plurality of light emitting elements arranged on a flexible sheet member along the mounting surface,
wherein the mounting section includes a mounting member for mounting the light source along the mounting surface, and
wherein the mounting member is at least one of:
a pin that is inserted into a hole cut in the flexible sheet member, a first side of the pin being integrally provided with the mounting surface and a second side of the pin is flattened by thermal caulking;
a first plurality of guide rails in which one set of sides of the flexible sheet member is fitted, and a pair of ribs that latch another set of sides of the flexible sheet member;
a snap-fit claw that is inserted into a hole cut in the flexible sheet member, and is hooked into the hole;
a second plurality of guide rails in which at least one side of the flexible sheet member is fitted, and a latch that is inserted into a hole cut in the flexible sheet member, and is locked;
a third plurality of guide rails in which one side of the flexible sheet member is fitted, and a pin that is inserted into a hole cut on other side of the flexible sheet member, and is subjected to a thermal caulking;
a fourth plurality of guide rails in which one side of the flexible sheet member is fitted, and a screw that fixes other side of the flexible sheet member; and
a plurality of pins and a plurality of ribs that are provided integrally on an inner peripheral surface of the lens, and a receiving rib that fixes the flexible sheet member by sandwiching the flexible sheet member with the pins and the ribs.

9. The illuminating unit according to claim 8, wherein the light source includes:
the flexible sheet member;
the light emitting elements that are surface mounted on a surface of the flexible sheet member; and
an electronic part for driving the light emitting elements to emit light.

10. The illuminating unit according to claim 8,
wherein some of the light emitting elements are directed towards a direction of a width of the vehicle away from the vehicle,
wherein other light emitting elements are directed slightly towards a rear side of the vehicle, and
wherein the light emitting elements work as a turning lamp that blinks.

11. The illuminating unit according to claim 8, wherein the mounting member is the pin that is inserted into the hole cut in the flexible sheet member, the first side of the pin being integrally provided with the mounting surface and the second side of the pin is flattened by thermal caulking.

12. The illuminating unit according to claim 8, wherein the mounting member is the first plurality of guide rails in which one set of sides of the flexible sheet member is fitted, and a pair of ribs that latches another set of sides of the flexible sheet member.

13. The illuminating unit according to claim 8, wherein the mounting member is the second plurality of guide rails in which at least one side of the flexible sheet member is fitted, and the latch that is inserted into the hole cut in the flexible sheet member, and is locked.

14. The illuminating unit according to claim 8, wherein the mounting member is the third plurality of guide rails in which one side of the flexible sheet member is fitted, and the pin that is inserted into a hole cut on other side of the flexible sheet member, and is subjected to a thermal caulking.

15. An outside mirror apparatus for a vehicle, the outside mirror apparatus comprising: a mirror with a mirror housing and an illuminating unit within the mirror housing, the illuminating unit comprising:
a light source including a plurality of light emitting elements arranged on a flexible sheet member;
a base including a mounting section for mounting the light source; and
a lens that forms, with the base, a lamp chamber that contains the light source,
wherein the light source is mounted on the mounting section in a curved state or in a bent state,
wherein the mounting section includes a mounting member for mounting the light source along the mounting surface, and
wherein the mounting member is at least one of:
a snap-fit claw that is inserted into a hole cut in the flexible sheet member, and is hooked into the hole;
a plurality of guide rails in which one side of the flexible sheet member is fitted, and a screw that fixes other side of the flexible sheet member; and
a plurality of pins and a plurality of ribs that are provided integrally on an inner peripheral surface of the lens, and a receiving rib that fixes the flexible sheet member by sandwiching the flexible sheet member with the pins and the ribs.

16. The outside mirror apparatus according to claim 15, wherein the mounting member is the plurality of guide rails in which one side of the flexible sheet member is fitted, and the screw that fixes other side of the flexible sheet member.

17. The outside mirror apparatus according to claim 15, wherein the mounting member is the plurality of pins and the plurality of ribs that are provided integrally on the inner peripheral surface of the lens, and the receiving rib that fixes the flexible sheet member by sandwiching the flexible sheet member with the pins and the ribs.

18. The outside mirror apparatus according to claim 15, wherein the mounting member is the snap-fit claw that inserted into the hole cut in the flexible sheet member, and is hooked into the hole.

19. An illuminating unit that is configured to be installed in an outside mirror apparatus for vehicle, the illuminating unit comprising:

a lens and a base that form a lamp chamber;

a mounting section that is provided on the base inside the lamp chamber, and that has a mounting surface that includes at least one flat surface or at least one curved surface, or both; and a light source that is mounted along the mounting surface, wherein the light source includes a plurality of light emitting elements arranged on a flexible sheet member along the mounting surface, wherein the mounting section includes a mounting member for mounting the light source along the mounting surface, and wherein the mounting member is at least one of:

a snap-fit claw that is inserted into a hole cut in the flexible sheet member, and is hooked into the hole;

a plurality of guide rails in which one side of the flexible sheet member is fitted, and a screw that fixes other side of the flexible sheet member; and a plurality of pins and a plurality of ribs that are provided integrally on an inner peripheral surface of the lens, and a receiving rib that fixes the flexible sheet member by sandwiching the flexible sheet member with the pins and the ribs.

20. The illuminating unit according to claim 19, wherein the mounting member is the snap-fit claw that inserted into the hole cut in the flexible sheet member, and is hooked into the hole.

21. The illuminating unit according to claim 19, wherein the mounting member is the plurality of guide rails in which one side of the flexible sheet member is fitted, and the screw that fixes other side of the flexible sheet member.

22. The illuminating unit according to claim 19, wherein the mounting member is the plurality of pins and the plurality of ribs that are provided integrally on the inner peripheral surface of the lens, and the receiving rib that fixes the flexible sheet member by sandwiching the flexible sheet member with the pins and the ribs.

* * * * *